(12) United States Patent
Hammes et al.

(10) Patent No.: US 7,409,567 B2
(45) Date of Patent: Aug. 5, 2008

(54) DEVICES WITH RECIPROCAL WAKE-UP FUNCTION FROM THE STANDBY MODE

(75) Inventors: Markus Hammes, Dinslaken (DE); Roland Hellfajer, Bochum (DE)

(73) Assignee: Infineon Technologies AG, Munich (DE)

( * ) Notice: Subject to any disclaimer, the term of this patent is extended or adjusted under 35 U.S.C. 154(b) by 332 days.

(21) Appl. No.: 10/925,565

(22) Filed: Aug. 25, 2004

(65) Prior Publication Data

US 2005/0086550 A1   Apr. 21, 2005

(30) Foreign Application Priority Data

Aug. 29, 2003   (DE) ................. 103 39 887

(51) Int. Cl.
*G06F 1/26* (2006.01)
*G06F 1/32* (2006.01)
*G06F 3/00* (2006.01)

(52) U.S. Cl. ............... 713/320; 713/300; 713/324; 710/15; 710/19

(58) Field of Classification Search ......... 713/300, 713/310, 320, 324; 710/305; 712/15, 19
See application file for complete search history.

(56) References Cited

U.S. PATENT DOCUMENTS

| | | | |
|---|---|---|---|
| 5,790,875 A * | 8/1998 | Andersin et al. ............ 713/320 |
| 5,845,139 A * | 12/1998 | Fischer et al. ............ 713/320 |
| 6,031,167 A * | 2/2000 | Gaston ................. 84/327 |
| 6,112,072 A | 8/2000 | Stiegler et al. ............ 455/343 |
| 6,199,134 B1 * | 3/2001 | Deschepper et al. ........ 710/311 |
| 6,240,521 B1 * | 5/2001 | Barber et al. ............ 713/323 |
| 6,438,462 B1 | 8/2002 | Hanf et al. ................. 700/297 |
| 6,883,105 B2 * | 4/2005 | Dutton ............... 713/323 |
| 7,188,263 B1 * | 3/2007 | Rubinstein et al. ......... 713/300 |
| 2002/0194596 A1 | 12/2002 | Srivastava .............. 725/37 |
| 2003/0088318 A1 | 5/2003 | Efogawa et al. ............. 700/1 |

FOREIGN PATENT DOCUMENTS

| | | |
|---|---|---|
| CN | 1392705 A | 1/2003 |
| CN | 1414443 | 4/2003 |
| DE | 42 26 704 A1 | 2/1994 |
| DE | 196 42 265 C1 | 10/1996 |
| DE | 196 11 942 A1 | 10/1997 |
| WO | 03065289 | 8/2003 |

OTHER PUBLICATIONS

KSR International Co. v. Teleflex Inc., 82 USPQ2d 1385 (U.S. 2007), pp. 1-16.*

* cited by examiner

*Primary Examiner*—Mark Connolly
(74) *Attorney, Agent, or Firm*—Dicke, Billig & Czaja, PLLC

(57) ABSTRACT

Apparatus (20) having two devices (21, 22) which can be connected to one another via an interface (23, 24), where the devices (21, 22) each have an activation unit which, upon receipt of a control signal at a control input, prompts the respective device (21, 22) to change over from a standby mode to an active mode, and where the control signal is transmitted by the respective other device (21, 22), and the control input in one device (21) is an interface connection and, in the other device (22), is located outside the interface (23, 24).

17 Claims, 1 Drawing Sheet

DEVICES WITH RECIPROCAL WAKE-UP FUNCTION FROM THE STANDBY MODE

PRIORITY

This application claims priority to German application no. 103 39 887.2 filed Aug. 29, 2003.

TECHNICAL FIELD OF THE INVENTION

The invention relates to an apparatus which comprises two devices which are connected to one another via an interface for the purpose of data interchange. The devices can prompt the respective other device to change from a power-saving standby mode to an active mode.

BACKGROUND OF THE INVENTION

The two devices may be a host and a peripheral device, for example. For the purpose of data communication, the host and the peripheral device can be connected together via a serial interface.

The peripheral device may be based on the Bluetooth standard, for example. The host may be a telecommunication device which operates on the basis of the GSM, UMTS or CDMA standard, for example.

In literature written in the German language, the English term "host" is always used as such and is not translated into German. Hence, the term "host" is retained in the rest of the text in the original.

It is conceivable for system resources provided by the host to be used by the peripheral device too. Thus, by way of example, the system clock, which is typically in a range between 10 and 100 MHz, or a clock for the standby mode, for example the clock timing at 32 768 kHz, or the voltage provided by a voltage supply chip may also be used for the peripheral device.

Since the host and the peripheral device are each autonomous systems, operating states may arise in which just the host or just the peripheral device is active and the respective other device is in a standby mode with just low power consumption.

To be able to use the system resources of the host, the peripheral device must be capable of requesting the necessary system resources from the host using request signalling. However, if the host is in the standby mode at the time at which the system resources are needed, then the peripheral device first needs to signal to the host that the host needs to exit the standby mode in order to be able to receive the request signal from the peripheral device.

In addition, an active state is needed on the part of the host and on the part of the peripheral device when data interchange is intended to take place between the host and the peripheral device via the serial interface. Otherwise, the receiver would not be able to receive the data, since the serial interface is not supplied with voltage in the standby mode.

A known way of "waking up" a respective device using the other device is to provide additional control lines between the two devices in addition to the serial interface via which the data transfer takes place. The control lines can be used by one device to ask the other device to exit the standby mode.

In addition, it is also known practice to transfer a wake-up signal between the two devices via the serial interface. This is a protocol-based option which can be used when at least one reception pin, which is part of the serial interface, has a wake-up function in each of the two devices. The wake-up function is designed such that a device switches from the standby mode to the active mode as soon as a signal is applied to the reception pin with the wake-up function.

SUMMARY OF THE INVENTION

It is an object of the invention to provide a further option which can be used by two devices to ask one another to change from the standby mode to the active mode.

The object on which the invention is based can be achieved by an apparatus comprising a first device and a second device, the first device and the second device being able to be connected to one another via an interface for the purpose of data interchange, wherein the first device has a first activation unit, which, upon receipt of a first control signal at a first control input, prompts the first device to change over from a standby mode to an active mode, the second device has a second activation unit, which, upon receipt of a second control signal at a second control input, prompts the second device to change over from a standby mode to an active mode, the first control signal is provided by the second device, the second control signal is provided by the first device, the first control input is a connection on the interface, and the second control input is located outside the interface.

The object can also be achieved by an apparatus comprising a first device and a second device, which can be connected to one another via an interface for the purpose of data interchange, a first activation unit within the first device, which, upon receipt of a first control signal provided by the second device at a first control input, prompts the first device to change over from a standby mode to an active mode, a second activation unit within the second device, which, upon receipt of a second control signal provided by the first device at a second control input, prompts the second device to change over from a standby mode to an active mode.

The first control signal can be provided on an interface connection on the second device, and/or the second control signal can be provided on an interface connection on the first device. The first and/or the second control signal can be a data packet which has no user data, in particular. The first device may have a first unit, which signals to the second device that the first device is changing over to the standby mode, and/or the second device may have a second unit, which signals to the first device that the second device is changing over to the standby mode. The first device may transfer just one second control signal to the second device when the second device is in a standby mode, and/or the second device may transfer just one first control signal to the first device when the first device is in the standby mode. The first device can be a host, and the second device can be a peripheral device which can be connected to the host. The interface can be used to transfer a clock signal and/or an operating or reference voltage. The two devices can be designed for telecommunication purposes.

The inventive apparatus comprises a first and a second device. The two devices can be connected to one another via an interface for the purpose of data interchange.

The first device has a first activation unit having a first control input. Upon receipt of a first control signal at the first control input, the first activation unit prompts the first device to change over from a standby mode to an active mode, provided that the first device is in the standby mode at this time and is not already in the active mode.

Correspondingly, the second device has a second activation unit, which, upon receipt of a second control signal at a second control input on the second activation unit, prompts the second device to change over from a standby mode to an active mode.

The first control signal is provided by the second device, while the second control signal is generated by the first device. The first control input is a connection on the interface. In contrast to this, the second control input is not a connection which is part of the interface.

The inventive apparatus permits the two devices to wake one another up from the standby mode. The invention permits this for two devices whose wake-up means are arranged outside the serial interface, in the case of one device, and downstream of the serial interface, in the case of the other device.

Preferably, provision may be made for the first control signal to be provided on an interface connection by the second device and/or for the second control signal to be provided on an interface connection via the first device.

Advantageously, the first and/or the second control signal is/are a data packet. Since the control signal is merely intended to signal to the receiver that the device in question needs to exit the standby mode, the data packet does not need to contain any user data, in particular.

In line with one preferred refinement of the invention, the first device has a first unit, which signals to the second device that the first device is changing over to the standby mode. Correspondingly, the second device may also contain a second unit, which signals to the first device that the second device is changing over to the standby mode. This measure is advantageous inasmuch as it means that the respective other device knows whether the receiver device needs to be woken up from the standby mode prior to a planned data transfer.

Preferably, the first device therefore transmits a second control signal to the second device only when the second device is in the standby mode. A corresponding situation may preferably also apply to the second device.

The first device may be a host, for example, and the second device may be a peripheral device which can be connected to the host.

The respective other device may be woken up not just for the purpose of subsequent data transfer but also, by way of example, in order to transfer a clock signal and/or an operating or reference voltage via the interface.

The two devices are preferably designed for telecommunication purposes.

BRIEF DESCRIPTION OF THE DRAWINGS

The invention is explained in more detail below by way of example with reference to the drawings, in which.

PREFERRED EMBODIMENTS OF THE INVENTION

Figure 1:
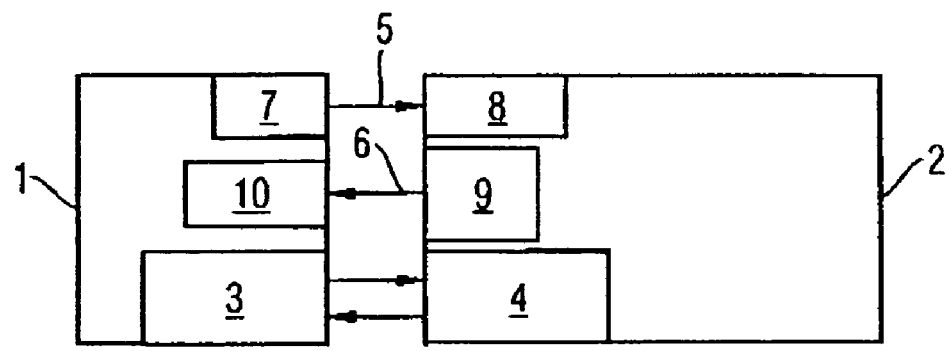
FIG. 1 shows a schematic diagram of two devices with means for waking one another up from the standby mode in line with the prior art.

FIG. 1 shows a host 1 and a peripheral device 2. The host 1 has a serial interface 3. The peripheral device 2 has a serial interface 4. The serial interfaces 3 and 4 connect the host 1 and the peripheral device 2.

In addition, the host 1 and the peripheral device 2 are connected by means of control lines 5 and 6. In the host 1, the control line 5 is supplied with a control signal by a unit 7. In the peripheral device 2, the control signal transferred via the control line 5 is received by the unit 8. In the opposite direction, a control signal is transferred via the control line 6. This control signal is generated by a unit 9 integrated in the peripheral device 2 and is received by a unit 10 integrated in the host 1.

The units 7 and 9 generate a control signal when the opposite party, that is to say the host 1 or the peripheral device 2, needs to be woken up from the standby mode. This control signal which is on the control line 5 or 6 is detected by the unit 8 or 10. Next, the unit 8 or 10 prompts the peripheral device 2 or the host 1 to return from the standby mode to the active mode.

After a certain length of time which is needed for the wake-up operation, and after optional reciprocal signalling that the standby mode has been exited, the serial interfaces 3 and 4 can be used for data interchange.

Figure 2:
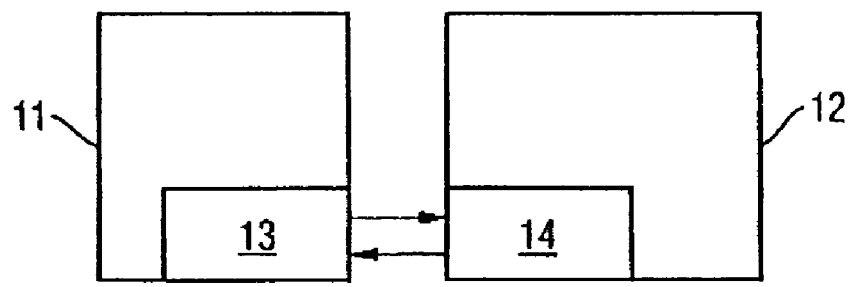
FIG. 2 shows a schematic diagram of two further devices with means for waking one another up from the standby mode in line with the prior art.

Another way of waking up a device from the standby mode is shown in FIG. 2. This figure shows a host 11 which is connected to a peripheral device 12 via serial interfaces 13 and 14.

So that the host 11 or the peripheral device 12 in the system shown in FIG. 2 can wake up the respective other device, at least one respective reception pin on the serial interfaces 13 and 14 needs to be configured such that a signal which is applied to this pin during the standby mode is detected and that the peripheral device 12 or the host 11 is subsequently prompted to change to the active mode.

Figure 3:
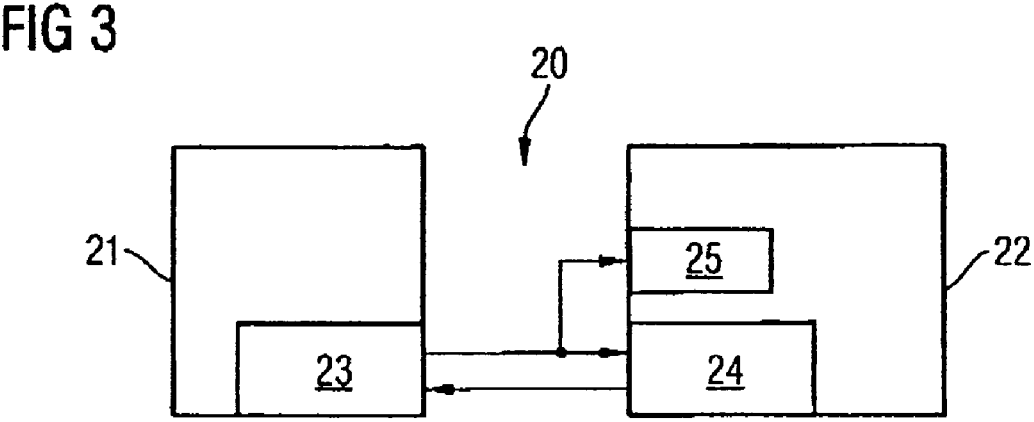
FIG. 3 shows a schematic diagram of an exemplary embodiment of the inventive apparatus.

FIG. 3 shows the schematic diagram of an apparatus 20 as an exemplary embodiment of the invention. The apparatus 20 comprises a host 21 and a peripheral device 22 which are connected via serial interfaces 23 and 24. In addition, the peripheral device 22 has a unit 25.

If the host 21 or the peripheral device 22 intend to wake up the respective opposite party from the standby mode, the host 21 uses the interface 23 to send a data packet to the peripheral device 22 or the peripheral device 22 uses the interface 24 to send a data packet to the host 21. These data packets are used to signal to the respective receiver that it needs to exit the standby mode. For this purpose, the data packets do not necessarily have to contain user data.

A data packet transmitted by the host 21 is received by the unit 25 in the peripheral device 22 in standby mode. Following receipt of such a data packet, the unit 25 prompts the peripheral device 22 to exit the standby mode.

If the data packet is transmitted from the peripheral device 22 to the host 21, it is received on a reception pin on the interface 23 in the host 21. The circuit arranged downstream of this reception pin is configured such that the arrival of a data packet is also identified during the standby mode in the host 21, and that this prompts changeover to the active mode.

So that every transfer of a user data packet does not need to be preceded by the transfer of a data packet in order to wake up the receiver end, provision may be made for each party, as soon as it changes to the standby mode, to notify the opposite party of this using a command sequence. In this case, prior to a planned data interchange, the opposite party needs to transmit a data packet for wake-up only when the other party is in standby mode.

Provision may also be made for the data packets received via the serial interface 23 or 24 to be logged. This can be done by numbering all of the data packets, for example. As a result, data packets which reach the host 21 or the peripheral device 22 while the standby mode is still in progress or during the activation operation and cannot be received at this time can be transferred again. The transfer of a data packet may possibly be repeated again and again until there is an indication that the full data packet has been received successfully.

In the exemplary embodiment shown in FIG. 3, the unit 25 prompting activation from the standby mode is associated with the peripheral device 22. The host 21 contains a wake-up unit downstream of the interface 23. As a departure from the exemplary embodiment shown in FIG. 3, the two wake-up units may also be exchanged.

We claim:

1. An apparatus comprising a first device and a second device, the first device and the second device are connected to one another via a first interface in said first device and second interface in said second device for the purpose of data interchange, wherein the first device has a first activation unit downstream of said first interface unit, wherein the first activation unit upon receipt of a first control signal at a first control input through said first interface, prompts the first device to change over from a standby mode to an active mode, the second device has a second activation unit outside said second interface, which, upon receipt of a second control signal at a second control input, prompts the second device to change over from a standby mode to an active mode, the first control signal is provided by the second device, the second control signal is provided by the first device, the first control input is a connection on the first interface, the second control input is a connection outside the second interface, the first device has a first unit, which signals to the second device that the first device is changing over to the standby mode, and the second device has a second unit, which signals to the first device that the second device is changing over to the standby mode.

2. The apparatus according to claim 1, wherein the first and/or the second control is/are a data packet which has no user data.

3. The apparatus according to claim 1, wherein
the first device transfers just one second control signal to the second device when the second device is in a standby mode, and/or
the second device transfers just one first control signal to the first device when the first device is in the standby mode.

4. The apparatus according to claim 1, wherein
the first device is a host, and
the second device is a peripheral device which can be connected to the host.

5. The apparatus according to claim 1, wherein the interface is used to transfer a clock and/or either an operating or reference voltage.

6. The apparatus according to claim 1, wherein the two devices are designed for telecommunication purposes.

7. An apparatus comprising
a first device having a first interface and a second device having a second interface, which can be connected to one another via said first and second interfaces for the purpose of data transmission,
a first activation unit within the first device downstream of said first interface unit, which, upon receipt of a first data transmission signal provided by the second device at said first interface, prompts the first device to change over from a standby mode to an active mode,
a second activation unit within the second device outside said second interface having an input, which, upon receipt of a second data transmission signal provided by the first device at said input, prompts the second device to change over from a standby mode to an active mode, wherein the first device has a first unit, which signals to the second device that the first device is changing over to the standby mode, and the second device has a second unit, which signals to the first device that the second device is changing over to the standby mode.

8. The apparatus according to claim 7, wherein the first activation unit monitors a data transmission line of the first interface.

9. The apparatus according to claim 7, wherein the second activation unit monitors a data transmission line of the second interface.

10. The apparatus according to claim 7, wherein
the first data transmission signal is provided on an input of said first interface, and/or
the second data transmission signal is provided on an input of said second interface.

11. The apparatus according to claim 7, wherein the first and/or second data transmission signal is/are a data packet which has no user data.

12. The apparatus according to claim 7, wherein
the first device transfers just one second data transmission signal to the second device when the second device is in a standby mode, and/or
the second device transfers just one first data transmission signal to a first device when the first device is in the standby mode.

13. The apparatus according to claim 7, wherein
the first device is a host, and
the second device is a peripheral device which is connected to the host.

14. The apparatus according to claim 7, wherein the interface is used to transfer a clock and/or either an operating or reference voltage.

15. The apparatus according to claim 7, wherein the two devices are design for telecommunication purposes.

16. A method of transmitting data between a first and second device via respective first and second communication interfaces, wherein the first and second device can be switched to/from an inactive state from/to an active state, the method comprising the steps of:

signaling by the first device to the second device that the first device is changing over to an inactive state;

when the first device is in the inactive state detecting a data signal received through said first communication interface by a first monitoring device arranged in said first device downstream of said first communication interface;

upon detection of a transmission from said second device to said first device via said communication interface, switching said first device into an active mode in which said first device is operable to receive data from said second device;

signaling by the second device to the first device that the second device is changing over to an inactive state;

when the second device is in the inactive state, monitoring said communication interface by a second monitoring device arranged outside said second communication interface and coupled in parallel with said second communication interface; and upon detection of a transmission from said first device to said second device via said communication interface, switching said second device into an active mode in which said second device is operable to receive data from said first device.

17. An apparatus comprising a first device and a second device, the first device and the second device being able to be connected to one another via an interface for the purpose of data interchange, wherein
  the first device has a first activation unit coupled downstream of a first communication interface having a first input, wherein upon receipt of a first control signal through said first input and through said first communication interface at the first activation unit, said first activation unit prompts the first device to change over from a standby mode to an active mode,
  the second device has a second communication interface and a second activation unit having a second input coupled in parallel with a third input of the second communication interface, wherein upon receipt of a second control signal at the second input, prompts the second device to change over from a standby mode to an active mode,
  the first control signal is provided by the second device,
  the second control signal is provided by the first device,
  the first device has a first unit, which signals to the second device that the first device is changing over to the standby mode, and
  the second device has a second unit, which signals to the first device that the second device is changing over to the standby mode.

* * * * *